Aug. 10, 1954    J. W. E. GRIEMSMANN    2,686,295
COAXIAL POWER METER
Filed July 10, 1946
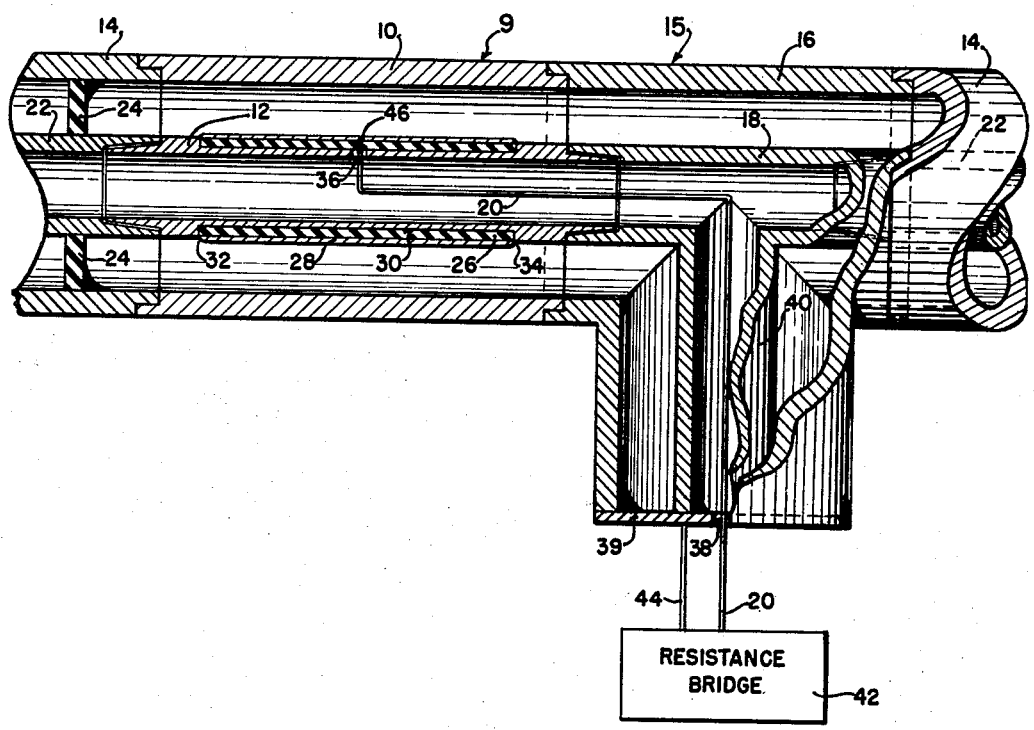
INVENTOR
JOHN W. E. GRIEMSMANN
BY
ATTORNEY Patented Aug. 10, 1954

2,686,295

UNITED STATES PATENT OFFICE 2,686,295

COAXIAL POWER METER

John W. E. Griemsmann, Queens Village, N. Y., assignor to the United States of America as represented by the Secretary of the Navy Application July 10, 1946, Serial No. 682,612

2 Claims. (Cl. 324—95)

This invention relates in general to a high frequency power meter and more particularly to a power meter particularly adapted to use with coaxial transmission lines.

The measurement of power at high frequency generally presents a number of problems, and involves the use of complex apparatus. One method of power measurement involves the use of resistance elements which change in value when exposed to high frequency energy. By comparison with an equivalent temperature change using a determinable amount of direct current power it is possible to calibrate such resistance devices directly in terms of high frequency power.

Heretofore, when employing such a resistance element, it has been the practice to suspend it in a wave guide carrying the energy to be metered, or in front of a radiating element. This procedure invariably introduced irregularities in the propagation of the high frequency energy, thereby causing undeterminable errors.

Thus, it is an object of this invention to provide simplified means for measuring high frequency power in an electrical transmission system, which means are fully enclosed within the system and do not affect energy transmission to an appreciable extent.

It is a further object of this invention to provide simplified means for measuring high frequency power flow, particularly adapted to use with a coaxial transmission line.

To accomplish the foregoing general objects, and more specific objects which hereinafter appear, this invention resides in the elements and their relation one to another, as are more particularly described in the following specification. The specification is accompanied by a drawing which illustrates one form of the invention.

Referring now to the figure, the present invention will be described in detail. A short coaxial line section 9, having a specially constructed inner conductor 12 within an outer conductive cylinder 10, is inserted in series electrically, with coaxial line sections 14—14. Also in series with coaxial line 14—14 and line section 9, is a T stub 15, having outer and inner conductors 16 and 18 respectively. The inner and outer conductors of all line sections mentioned, namely 9, 14—14, and 15 are joined electrically and mechanically in any suitable manner, as for example by a sliding fit as illustrated in the drawing.

The inner, hollow conductor 18 of T junction 16 is merely used to bring out an insulated lead 20 from the center conductor 12 of line section 9, without passing through the dielectric region between conductors of the transmission line. Further, the T section 15 serves as a stub support for inner conductors 22 and 12 of lines 14 and 9 respectively. Dielectric spacer 24 supports center conductors 22 and 12 in the coaxial arrangement shown.

In accordance with the principles of the present invention, cylindrical conductor 12 is machined to provide a reduced diameter section 30. An insulated sleeve 26 is secured within the undercut section 30, and an encircling metallic coating applied thereto. The metallic coating extends over the entire surface of sleeve 26, contacts inner conductor 12, and conforms essentially, with the shape and surface of conductor 12. Coating 28 is thus electrically connected to conductor 12 at its circular ends 32 and 34.

An insulated lead 20 is connected to the metallized coating 28 at point 46 and passes through hole 36 in inner conductor 12 and thence through the hollow centers of inner conductor 12 of line section 9, and inner conductors 18 and 40 of a T stub 16 and out through opening 38 in the base plate 39 of T stub 16 to a resistance bridge 42. A second lead 44 to bridge 42 is taken directly from the metal wall of the stub 16. The latter lead provides a D. C. path through inner conductors 40, 18, and 12 to the ends of the metallized coating 28 on inner conductor 12. The bridge 42 is thus connected across metallized coating 28 from point 46 to its outer edges 32 and 34 where it joins the conductor 12.

Energy passing through coaxial lines 14, 10 and 16 in either direction passes over the metallized film 28 on the inner coaxial conductor 12. In coaxial lines, at high frequencies, the current does not penetrate deeply but travels near the surface of the conductor. The electromagnetic field of the line is confined to the space between the inner and outer conductors. As the resistivity of a conductor increases the current tends to penetrate more deeply therein.

Thus, in the present invention power flowing through the coaxial line 14 does not cause a current to penetrate very far into the inner conductor 22. However, as this energy passes through section 10 it is guided over the coated inner conductor 12. The energy passing over metallized film 28, which has a higher resistance than the conductor 12 penetrates through the metallized film 28 and insulating sleeve 26 to the metal surface 30 of the conductor 12. The metallized film 28, absorbs a small, but fixed fraction of the power transmitted over coaxial line 14. This power serves to heat the metallized film 28 thus changing its resistance, in accordance with well known principles. A high resistance film 28 is preferably used to give a sufficiently small percentage of power dissipation in this application.

Power passing through the coaxial line 14 will heat the metallized film 28 in proportion to its intensity, to change its resistance. Resistance bridge 42 is used to measure this change and is calibrated to read the power being transmitted. Thus, this invention provides a power meter which may be incorporated as an integral part of the system without interfering with normal operation to any appreciable extent.

It is believed that the construction and operation as well as the advantages of this improved power meter will be apparent from the foregoing detailed description thereof. It will also be apparent that while the invention has been shown and described in a preferred form changes may be made in the construction disclosed without departing from the spirit of the invention as sought to be defined in the following claims.

What is claimed is:

1. A high frequency power meter for use with a coaxial transmission line comprising, a hollow inner conductor having an encircling high resistance metallic film, said film being insulated from said conductor except at the ends thereof, a T stub having a hollow center conductor connected in series with said transmission line adjacent to said first mentioned inner conductor, an insulated lead connected to said metallic film extending through said T stub inner conductor and passing out of said coaxial transmission line, means for transmitting high frequency power through said coaxial transmission line, said metallic film being operative to vary in temperature by dissipating a small fraction of said transmitted power, a connection through said inner coaxial conductor to said metallic film, a resistance bridge, said insulated lead and said last mentioned connection being coupled to said resistance bridge for measuring the resistance of said metallic film.

2. A high frequency power meter adapted for serial insertion into a transmission line having inner and outer cylindrical, coaxially disposed conductors, said power meter comprising, a T coaxial stub section adapted for serial insertion into said transmission line, said T stub section comprising first and second conductively-joined, mutually perpendicular, hollow, inner conductor sections, the hollows of said first and second inner conductor sections communicating with each other, first and second conductively-joined, mutually perpendicular, outer conductor sections, said first inner conductor section and said first outer conductor section being coaxially disposed to form a first transmission line section corresponding in cross section to the cross section of said transmission line, said first inner conductor section being formed with a length of reduced diameter, an insulating sleeve surrounding said length of reduced diameter, the outer diameter of said sleeve being equal to the outer diameter of said first inner conductor section, a metallic film covering the outer surface of said sleeve and electrically bonded to said first inner conductor section at the ends of said sleeve, said film having a thickness substantially less than the depth of the current penetration of said inner conductor of said transmission line, said film being adapted to change in resistance with changes in current flow therein, said second inner conductor section and said second outer conductor section being coaxially disposed to form a second transmission line section, a plate conductively joining said second inner conductor section and said second outer conductor section at a region displaced from the junction of said first and second inner conductor sections, said plate being formed with an opening communicating with said hollow of said second inner conductor section, said first inner conductor section at the length of its reduced diameter being formed with an opening communicating with said insulating sleeve and said hollow of said first inner conductor section, a resistance bridge having two terminals, an insulated conductive lead conductively secured to said metallic film at one end and to a terminal of said bridge at its other end, said lead extending through said dielectric sleeve, said opening in said first inner conductor section and said hollow of said first inner conductor section, said hollow of said second inner conductor section and said opening of said plate, and means connecting the other terminal of said bridge conductively to said plate.

References Cited in the file of this patent

UNITED STATES PATENTS

| Number | Name | Date |
|---|---|---|
| 2,262,134 | Brown | Nov. 11, 1941 |
| 2,284,379 | Dow | May 26, 1942 |
| 2,399,674 | Harrison | May 7, 1946 |
| 2,417,820 | Ginzton | Mar. 25, 1947 |
| 2,464,277 | Webber | Mar. 15, 1949 |
| 2,496,541 | Johnson, Jr. | Feb. 7, 1950 |
| 2,510,613 | Webber et al. | June 6, 1950 |